United States Patent [19]

Quaeck

[11] Patent Number: 5,228,556
[45] Date of Patent: Jul. 20, 1993

[54] LIQUID-TIGHT RECIPROCATING FLOOR CONSTRUCTION

[76] Inventor: Manfred W. Quaeck, 1515-210th Ave. NE., Redmond, Wash. 98053

[21] Appl. No.: 944,697

[22] Filed: Sep. 14, 1992

Related U.S. Application Data

[62] Division of Ser. No. 749,522, Aug. 26, 1991, Pat. No. 5,165,525.

[51] Int. Cl.$^5$ ............................................. B65G 25/00
[52] U.S. Cl. ................................. 198/750; 414/525.1
[58] Field of Search .................... 198/750; 414/525.1, 414/525.9

[56] References Cited

U.S. PATENT DOCUMENTS

| Re. 33,196 | 4/1990 | Foster | 198/750 |
|---|---|---|---|
| 3,534,875 | 10/1970 | Hallstrom, Jr. | |
| 4,143,760 | 3/1979 | Hallstrom | 198/750 |
| 4,144,963 | 3/1979 | Hallstrom | 198/750 |
| 4,157,761 | 6/1979 | Debor | 198/737 X |
| 4,184,587 | 1/1980 | Hallstrom | 198/750 |
| 4,492,303 | 1/1985 | Foster | 198/750 |
| 4,611,708 | 9/1986 | Foster | 198/750 |
| 4,679,686 | 7/1987 | Foster | 198/750 |
| 4,691,819 | 9/1987 | Hallstrom, Jr. | 198/750 |
| 4,727,978 | 3/1988 | Hallstrom, Jr. | 198/750 X |
| 4,749,075 | 6/1988 | Foster | 198/750 |
| 4,785,929 | 11/1988 | Foster | 198/750 |
| 4,856,645 | 8/1989 | Hallstrom, Jr. | 198/750 |
| 4,940,132 | 7/1990 | Foster | 198/750 |
| 4,984,679 | 1/1991 | Foster | 414/525.1 X |
| 5,064,052 | 11/1991 | Foster | 414/525.1 X |
| 5,088,595 | 2/1992 | Hallstrom, Jr. | 198/750 |
| 5,096,356 | 3/1992 | Foster | 414/525.1 X |
| 5,103,866 | 4/1992 | Foster | |
| 5,125,502 | 6/1992 | Foster | 198/750 |
| 5,165,525 | 11/1992 | Quaeck | 198/750 |

*Primary Examiner*—D. Glenn Dayoan
*Assistant Examiner*—Tuan N. Nguyen
*Attorney, Agent, or Firm*—Graybeal Jackson Haley & Johnson

[57] ABSTRACT

A liquid-tight reciprocating floor construction includes a plurality of slats slidable on a plurality of stationary bases, with each base supporting an individual slat. Each of the bases is unitary in construction such that liquid leaking through the points of contact between the salt and the base cannot reach the floor supporting the bases. The bases are interconnected by mating flanges, and seals adjacent the mating flanges prevent liquid from leaking through the flanges to the supporting floor.

30 Claims, 6 Drawing Sheets

LIQUID-TIGHT RECIPROCATING FLOOR CONSTRUCTION

This is a divisional of the prior application Ser. No. 07/749,522, filed Aug. 26, 1991, now U.S. Pat. No. 5,165,525 the benefit of the filing dates of which are hereby claimed under 35 USC 120.

BACKGROUND OF THE INVENTION

The present invention pertains to slat-type conveyors for movement of a load. More particularly, the present invention pertains to a liquid-tight reciprocating floor construction for load movement.

Conveyors having interleaved slats in general are disclosed in U.S. Pat. Nos. 3,534,875; 4,143,760; and 4,856,645 all issued to Hallstrom; and U.S. Pat. No. 4,611,708 issued to Foster. U.S. Pat. No. 3,534,875 discloses a slat conveyor having three groups of slats, two of which move simultaneously in a load-conveying direction, while at the same time, the third group moves in the opposite direction. In U.S. Pat. Nos. 4,143,760 and 4,611,708, three groups of slats all move simultaneously in a first load conveying direction and then each individual group moves sequentially in the opposite direction. U.S. Pat. No. 4,856,645 teaches a slat conveyor having a group of non-moving "dead" slats spaced between two groups of slats that move simultaneously in a load conveying first direction and sequentially in an opposite direction. All of the above slat conveyors suffer from leakage of liquid containing loads through the spacings between the individual slats and through the supporting floor. This leakage is extremely undesirable when toxic waste such as pesticides, paints, and other chemicals, or garbage is being conveyed. As will be readily apparent below, the liquid-tight reciprocating floor construction of the present invention can be employed with any of the slat reciprocation sequences of the above patents.

U.S. Pat. No. 4,157,761 discloses a discharge mechanism for discharging particulate loads that includes first and second stoker rods each having a plurality of cross bars. A fixed floor angle is located between each of the cross bars. The first and second stoker rods reciprocate lengthwise, rapidly, and, at the same time but out of phase. Again, the above patent does not disclose a liquid-tight floor construction, and thus suffers from liquid leakage.

U.S. Pat. Nos. 4,492,303; 4,679,686; 4,749,075; and 4,785,929 all issued to Foster disclose various components for reciprocating floor conveyors including hold-down members, bearing systems, and drive/guide systems. However, none of the above references teach a reciprocating floor construction that is liquid-tight.

A need thus exists for a reciprocating floor construction comprised of a plurality of slats slidable on a plurality of stationary liquid-tight bases. The unitary construction of the bases prevents liquid that leaks through the points of contact of each slat and each base from reaching the floor supporting the bases.

The need also exists for the above liquid-tight reciprocating floor construction in which a plurality of bearings cause reciprocation of each slat on each base without compromising the integrity of the base. A need also exists for the above type of liquid-tight reciprocating floor construction in which the base can be fixedly attached to a floor member without causing liquid leakage by compromising the unitary construction of the base.

SUMMARY OF THE INVENTION

The present invention is a liquid-tight reciprocating floor construction for movement of a load, and includes a plurality of slats slidable on a plurality of stationary liquid-tight bases, with each base supporting an individual slat. The unitary construction of the bases prevents liquid that leaks through the points of contact of each slat and each base from reaching the floor supporting the bases.

The bases are interconnected, preferably by either mating flanges or a tongue-in-groove configuration on each base. Seals adjacent the mating flanges or the tongue-in-groove configuration prevent liquid from leaking through these points of attachment to the supporting floor.

In the preferred embodiment of the present invention, the mating flanges or tongue-in-groove configurations are located on the side of each base, and the seals are located between the mating flanges or tongue-in-groove configuration.

In an alternate embodiment of the present invention, the side of each base has a top portion, and the seal is located in a channel formed in each top portion.

In another alternate embodiment of the present invention the side of each base has an outer beveled edge that forms a channel when fitted against the outer beveled edge of another base. The seal is located in the channel so formed.

In the preferred embodiment of the present invention, each base is fastened to a flanged floor cross-member by a bolt through the flange of the floor cross-member. The head of the bolt holds a lip on the exterior part of the side of the base against the flange of the floor cross-member. A nut on the bolt braces the bolt against the flange. The above configuration allows attachment of the base to the floor cross-member without causing liquid leakage by compromising the unitary construction of the base.

In the preferred embodiment of the present invention, each slat reciprocates relative to each base on three groups of bearings. A side bearing is located between each side of the slat and each side of the base. The slat and base sides are shaped to receive these bearings. Additionally, a central bearing is located between longitudinal bearing support guides on the interior of the top of the slat. This central bearing is also supported by a central rib longitudinally bisecting the base.

BRIEF DESCRIPTION OF THE DRAWINGS

These and other features of the invention will be more fully appreciated when considered in light of the following specification and drawings in which.

DETAILED DESCRIPTION OF THE PREFERRED EMBODIMENT

The present invention is a liquid-tight reciprocating floor construction for movement of loads by sequential slat movement with respect to liquid-tight base portions. Slat reciprocation is accomplished by motor, gearing, and linkage means known in the art, and any one of numerous slat movement sequences also known in the art can be employed. Specific reference is made to the patents described above for examples of slat drive means and slat reciprocation sequences.

Figure 1:
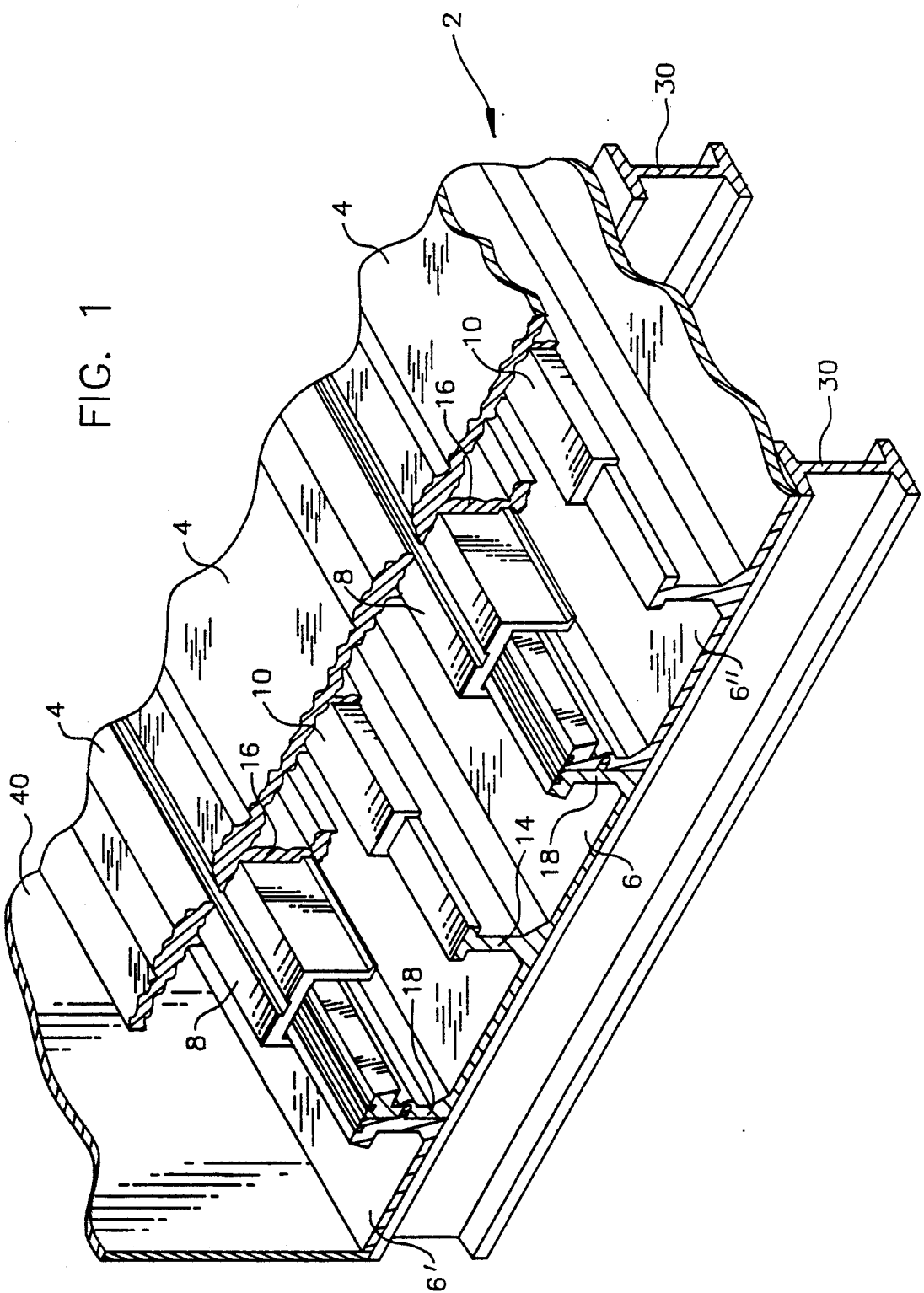
FIG. 1 is a perspective view of a fragmentary portion of a typical embodiment of the liquid-tight reciprocating floor construction of the present invention.
Figure 2:
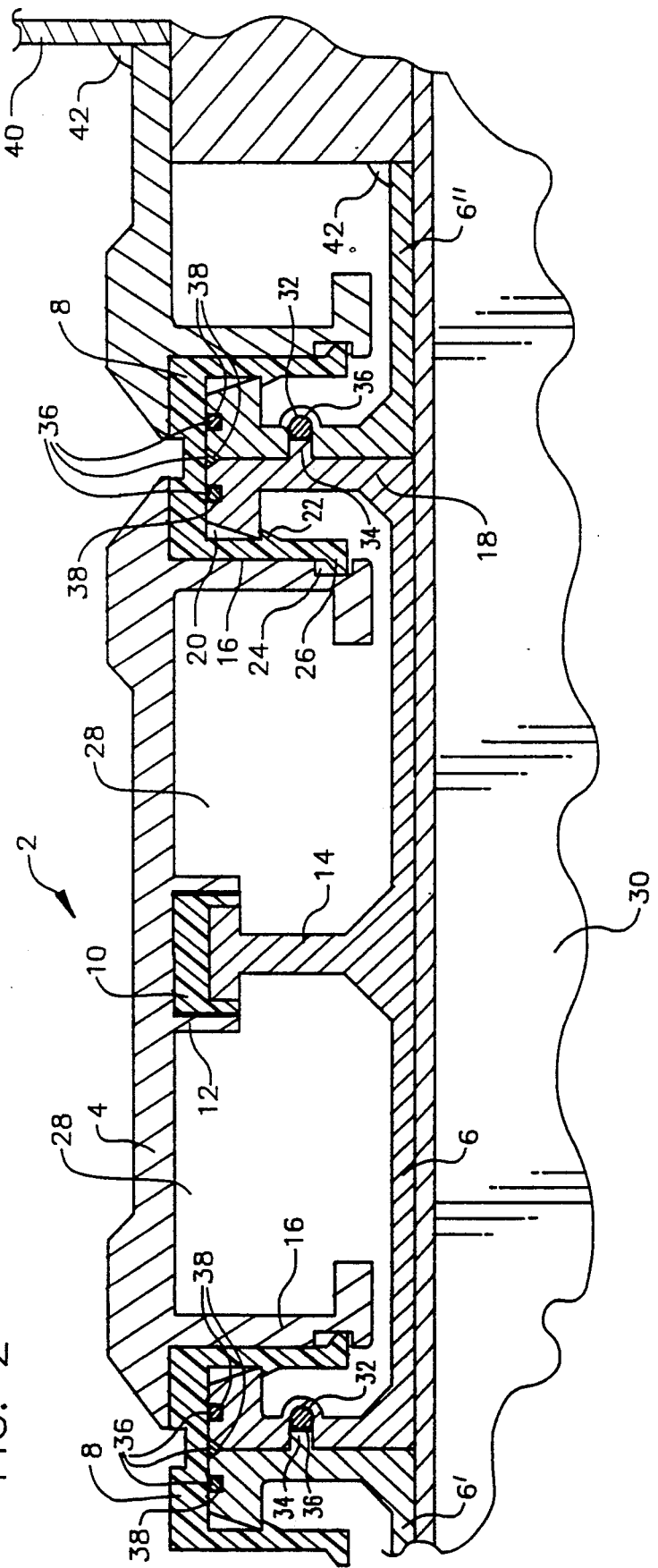
FIG. 2 is an end view of a first embodiment of the present invention of FIG. 1.

Referring to FIGS. 1 and 2, liquid-tight reciprocating floor construction 2 includes slat 4 slidably mounted on base 6. Side bearings 8 and central bearing 10, all preferably being substantially U-shaped, allow sliding reciprocation of slat 4 relative to base 6. Central bearing 10 is braced between central bearing guides 12 on the interior portion of the top of slat 4 and central rib 14 which longitudinally bisects base 6. Each side bearing 8 is held between a side 16 of slat 4 and a side 18 of base 6. Side 18 of base 6 has a sloped face 20 which facilitates attachment of side bearing 8. Side bearing 8 includes a lip 22 that engages side 18 of base 4 below sloped face 20. Side 16 of slat 4 includes a longitudinal groove 24 adapted to mesh with foot 26 located at the end of side bearing 8. Thus, side bearing 8 secures slat 4 to base 6 while allowing slat 4 to reciprocate relative to base 6.

The orientation of slat 4 on base 6 defines a chamber 28. Liquid from a liquid-containing load which collects on the top surface of slat 4 may leak into chamber 28 through the points of contact of sides 16 of slat 4 and side bearings 8. It is important to note, however, that, due to the unitary construction of base 6, any liquid located in chamber 28 cannot pass through base 6 and contact floor member 30. Thus, liquid-tight reciprocating floor construction 2 prevents liquid in chamber 28 or on slat 4 from exiting liquid-tight reciprocating floor construction 2 and contaminating the external environment. It should be noted that the term "unitary" employed to define the construction of base 6 means that base 6 lacks any openings or orifices which communicate with floor member 30.

Base 6 can be fixedly attached to other bases 6' and 6" by a tongue-in-groove attachment construction. In this manner, numerous bases 6 are employed to support numerous slats 4. In this tongue-in-groove construction, the side 18 of base 6 that is adjacent base 6' has a groove 32 therein. Base 6' has a tongue 34 in its side that is oriented to mate with groove 32. On side 18 of base 6 that is adjacent base 6" is another tongue 34. Another groove 32 is located on the side of base 6" at an orientation to mate with the tongue 34 on side 18 of base 6. In this manner, base 6 can be attached to base 6' and base 6".

In order to ensure that liquid in chamber 28 does not exit base 6 at the points of contact of base 6 with base 6' and base 6", seal 36 is employed. Seal 36 is preferably comprised of an elastomeric or a semi-elastomeric polymer composition known in the art. Seal 36 is preferably located between each tongue 34 and groove 32 of the tongue-in-groove constructions connecting base 6 with base 6' and base 6". However, seal 36 can also be located in a channel 38 located in the top of side 18 of base 6. Alternatively, channel 38, containing seal 36, can be located in the top of the side of base 6' and/or base 6". In yet another embodiment of the present invention, two channels 38 containing two seals 36 can be formed by beveling the outer edges of each side 18 of base 6 and the outer edges of the sides of base 6' and 6". In this manner, two V-shaped channels 38 having seals 36 therein are formed.

For bases located adjacent a side wall 40 such as base 6", seals or welds 42 are employed to prevent liquid leakage onto floor member 30. In the present embodiment of the invention as shown in FIGS. 1 and 2, slat 4, base 6 and floor member 30 are all preferably comprised of aluminum or alloys thereof. Thus base 6 is preferably attached to floor member 30 (which is preferably an I-beam) by welding. Prior to welding, channel locks are employed to compress seal 36 when it is located between groove 32 and tongue 34 in order to ensure a liquid-tight attachment of base 6 with base 6' and with base 6".

Figure 3:
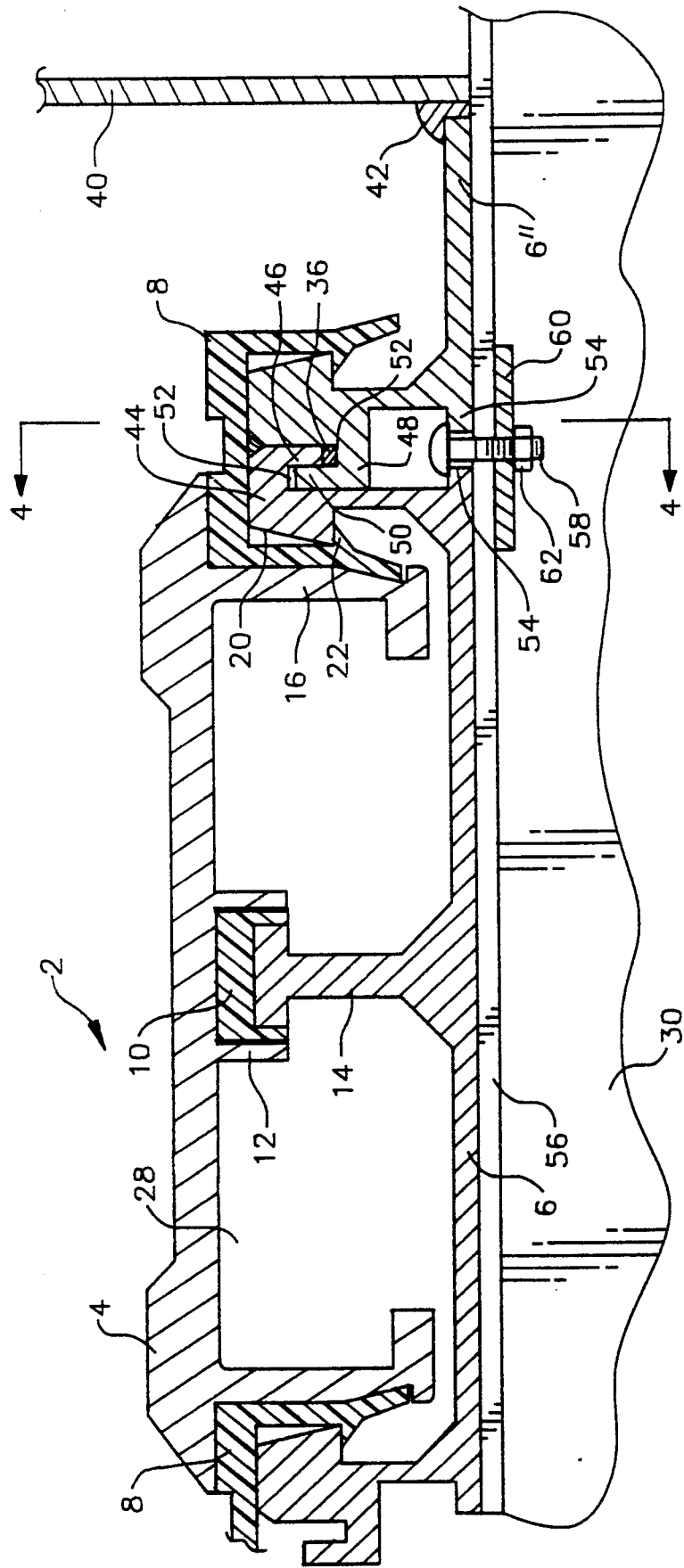
FIG. 3 is an end view of a fragmentary portion of a second embodiment of the present invention.
Figure 4:
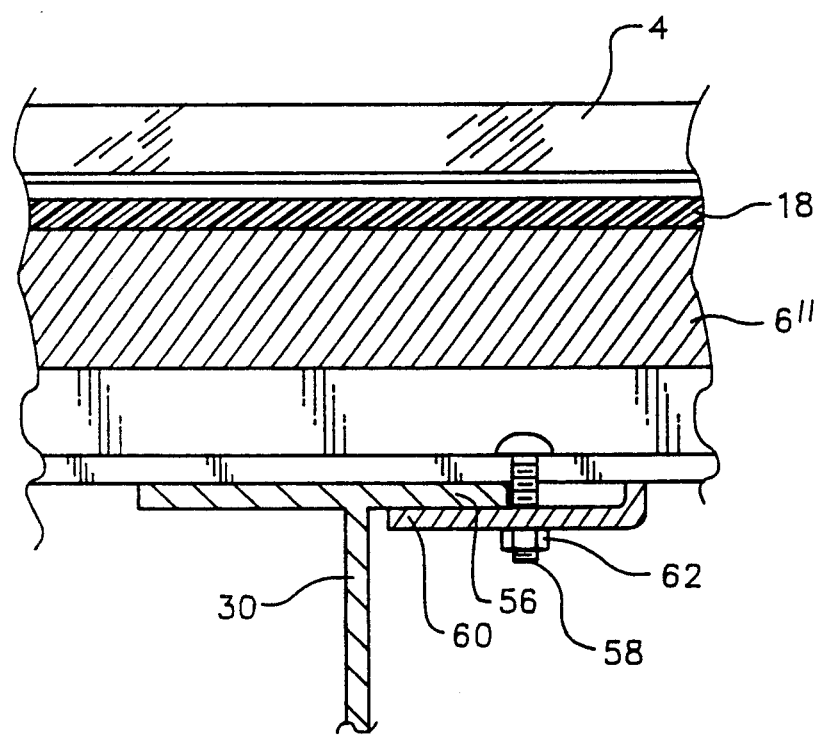
FIG. 4 is a side view of the fragmentary portion of the second embodiment of the present invention.

Referring now to FIGS. 3 and 4, an alternate embodiment of the present invention is shown in which slat 4 and base 6 are preferably comprised of aluminum or its alloys, and floor member 30 (which is preferably an I-beam) is preferably comprised of steel or the like. Due to the difficulties associated with welding aluminum and steel, this embodiment of the present invention contemplates mechanical attachment of base 6 to floor member 30. It is to be noted that reference numerals in FIGS. 3 and 4 which are the same as reference numerals in FIGS. 1 and 2 identify components common to the two embodiments.

In this second embodiment, instead of a tongue-in-groove construction for the attachment of base 6 with additional bases, complementary shaped flanges on adjacent bases are employed. Specifically, side 18 of base 6 includes flange 44 which is preferably substantially L-shaped having an arm 46 oriented substantially downwardly. Base 6" has a complementary flange 48 having an arm 50 oriented substantially upwardly such that flange 44 and flange 48 mate. Note that each of the L-shaped flanges 44 and 48 thus have a seat 52 in which the arm of the complementary flange resides. Seal 36 can be located in one or both of these seats 52 in order to ensure a liquid-tight connection.

Lips 54 on base 6 and base 6" are located adjacent the points of contact of base 6' and 6" with rib or flange 56 of the preferably I-beam shaped floor member 30. Bolt 58 is adapted to pass adjacent to rib 56 and brace lips 54 against rib 56 of floor member 30. Retainer 60 passes over bolt 58 and braces the underside of rib 56. Nut 62 is threadedly secured to bolt 58 and, when tightened, urges retainer 60 against flange 56 and tightens the contact between the head of bolt 58 and lips 54 such that base 6 and base 6" are securely attached to rib 56 of floor member 30 and flange 44 and flange 48 compress seal 36 to ensure a liquid-tight connection. It is to be noted that the above attachment of base 6 and base 6" to rib 56 of floor member 30 is accomplished without compromising the integrity of the unitary construction of base 6 (and base ") in chamber 28 or of floor member 30 thus reducing the likelihood of liquid leakage.

Figure 5:
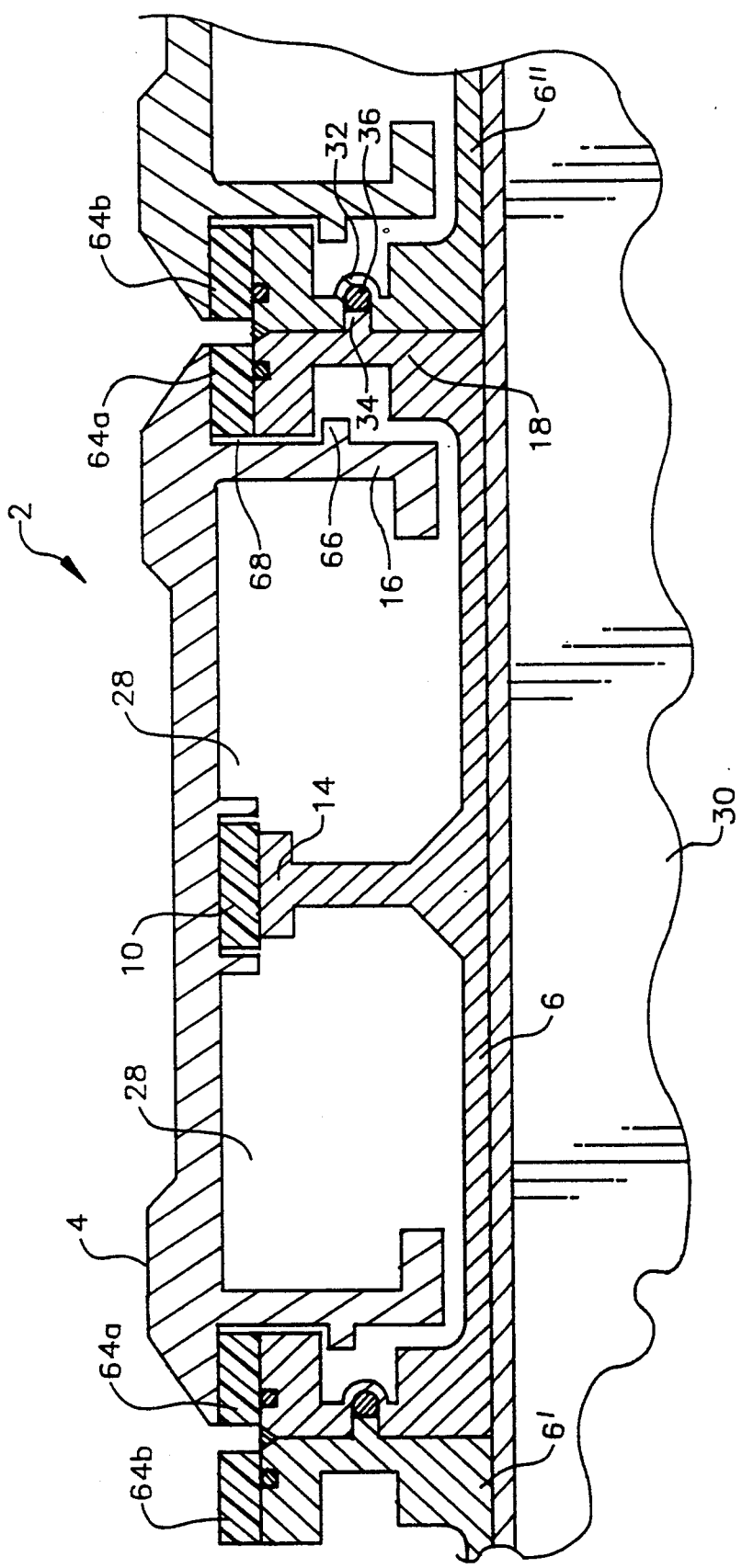
FIG. 5 is an end view of a third embodiment of the present invention.
Figure 6:
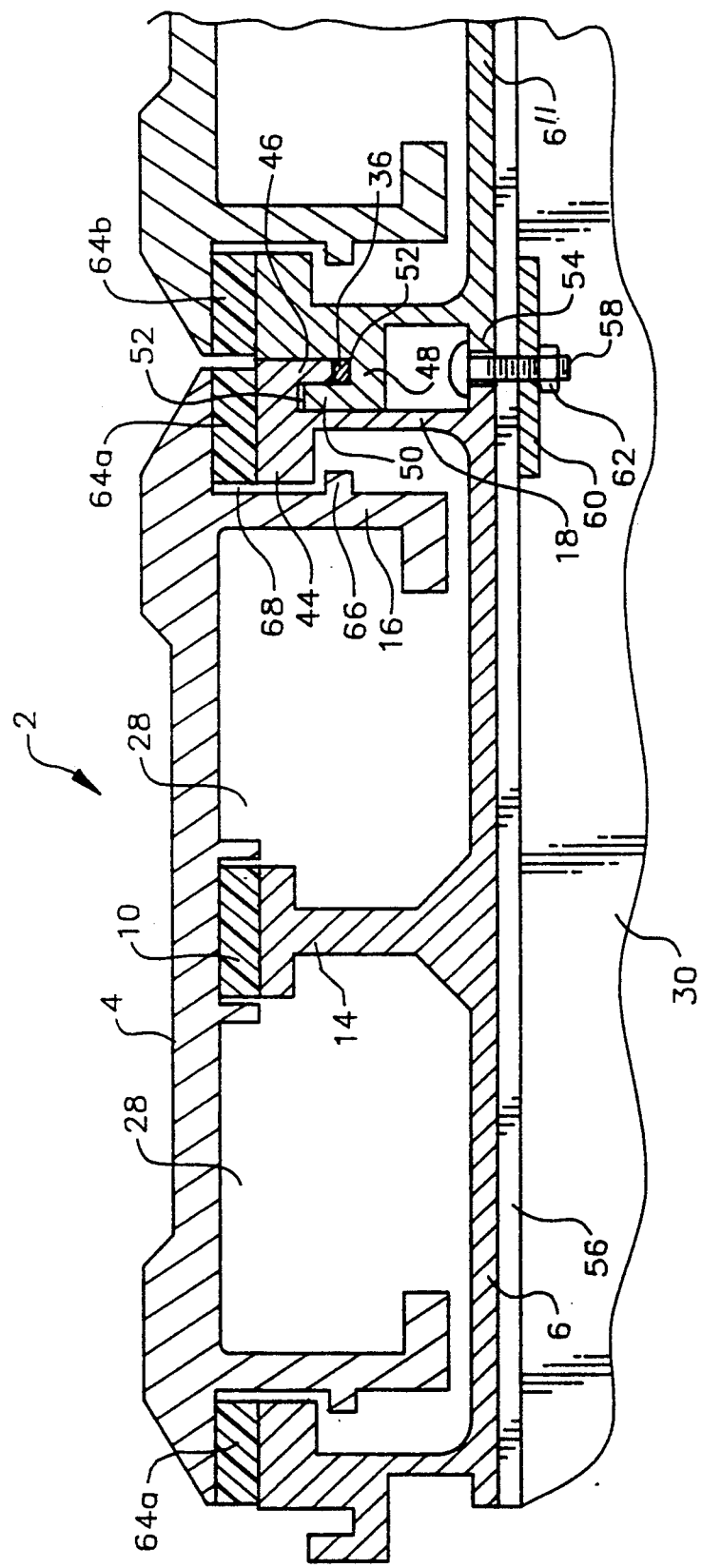
FIG. 6 is an end view of a fourth embodiment of the present invention.

Referring now to FIGS. 5 and 6, third and fourth embodiments of the present invention are shown, respectively. The third embodiment of FIG. 5 employs the tongue-in-groove construction (tongue 34 and groove 32) of the first embodiment of FIGS. 1 and 2 for connecting base 6 with additional bases. The fourth embodiment of FIG. 6 employs the interconnecting flange construction (flange 44 and flange 48) of the second embodiment of FIGS. 3 and 4 for connecting base 6 with additional bases. It is to be noted that the reference numerals in FIGS. 5 and 6 which are the same as reference numerals in FIGS. 1 through 4 identify common elements.

Both FIG. 5 and FIG. 6 disclose embodiments which allow modular construction of a slat 4 and a base 6 by the manufacturer to form a discrete pre-assembled unit prior to acquisition by the ultimate user. Thus, the user can more conveniently assemble liquid-tight floor construction 2 merely by connecting the desired number of these pre-assembled modular units comprised of slat 4 and base 6. Connection by the user is preferably either by the tongue-in-groove construction shown in FIG. 5 and described above in conjunction with FIGS. 1 and 2, or by the interconnecting flange construction shown in FIG. 6 and described above in conjunction with FIGS. 3 and 4.

In contrast, the first embodiment of FIGS. 1 and 2 and the second embodiment of FIGS. 3 and 4 are not comprised of modular units of a slat 2 and a base 4 pre-assemblable by the manufacturer. In the first two embodiments, the ultimate user has to first interconnect all of the bases 6, 6', 6", etc., then position all of the required side bearings 8 and central bearings 10, and finally attach all of the slats 4. The above assembly requires the implementation of jigs by the user, and forces the user to undertake additional assembly steps.

The modular unit configuration of liquid-tight floor construction 2 of FIGS. 5 and 6 is mainly due to the use of two separate planar side bearings 64a and 64b in place of the single u-shaped side bearing 8 shown in FIGS. 1 through 4. These side bearings 64a and 64b are preferably comprised of a high density plastic composition known in the art, as is side bearing 8 of FIGS. 1 through 4.

Unlike side bearing 8 of FIGS. 1 through 4, which snaps onto side 18 of base 6 and guides the reciprocation of slat 4 relative to base 6 by meshing of foot 26 of side bearing 8 in longitudinal groove 24 of slat 4, side bearings 64a and 64b of FIGS. 5 and 6 do not guide reciprocation of slat 4 on base 6. Instead, rib 66 on side 16 of slat 4 holds side 18 of base 6 and bearing 64a (or 64b) in channel 68 on side 16 of slat 4 to guide reciprocation of slat 4 relative to base 6.

To assemble each modular unit comprised of a base 6 and a slat 4, the side bearings 64a, for example, are placed on side 16 of base 6 and central bearing 10 is placed on central rib 14. Next, slat 4 is slidably mounted over side bearings 64a and central bearing 10 on base 6 such that side 18 of base 6 is held in channel 68 on side 16 of slat 4 by rib 66. The above modular unit can then be supplied to the ultimate uses in the above pre-assembled configuration. To assemble a liquid-tight floor construction 2 of a desired size, the user then connects the required number of the above pre-assembled modular units by either the above described tongue-in-groove construction or the interconnecting flange construction.

While particular embodiments of the present invention have been described in some detail hereinabove, changes and modifications may be made in the illustrated embodiments without departing from the spirit of the invention.

I claim:

1. A reciprocating floor construction comprising:
    a slat having exterior sides; and
    a base section having a bottom and exterior sides substantially perpendicular to said bottom, said slat slidably mounted on said base section such that said exterior sides of said base section are located outwardly of said exterior sides of said slat and are adapted to abut the exterior sides of adjacent base sections to prevent passage of matter beneath said slat.

2. The construction of claim 1, further comprising liquid seal means wherein said side of said base section has a top portion with a channel therein, and said liquid seal means is a gasket in said channel.

3. The construction of claim 1, further comprising liquid seal means wherein said side of said base section has an exterior edge beveled to form a channel upon attachment with another base section, and said liquid seal means is a gasket in said channel.

4. The construction of claim 1, further comprising liquid seal means wherein said attachment of said base section to another base section is by a tongue longitudinally disposed on said side and is adapted to fit with a groove on another base section.

5. The construction of claim 4, wherein said liquid seal means is a gasket between said tongue and the groove.

6. The construction of claim 1, further comprising liquid seal means wherein said attachment of said base section to another base section is by seal longitudinally disposed on said side and adapted to fit with a flange on another base section.

7. The construction of claim 6, wherein said liquid seal means is a gasket between said seat and the flange.

8. The construction of claim 1, further comprising liquid seal means wherein attachment of said base section to another base section by a substantially L-shaped flange on said side adapted to mate with a complementary substantially L-shaped flange on another base section.

9. The construction of claim 8, wherein said liquid seal means is a gasket between said substantially L-shaped flange of said base section and the complementary substantially L-shaped flange.

10. The construction of claim 1 further comprising an apparatus for retaining a reciprocating floor component on a supporting floor, the reciprocating floor component including said slat and said base section, said slat being slidably mounted on said base section, said base section having a lip on said side and the supporting floor having a flange, said apparatus comprising:
    an elongate member having a broadened portion;
    a retainer adjacent said elongate member; and
    fastening means for securing said retainer to said elongate member such that said lip of said base section and the flange of the support floor are braced between said broadened portion of said elongate member and said retainer without compromising the structural integrity of said base section and the floor member.

11. A reciprocating floor construction comprising:
    a slat having a load supporting surface and a pair of exterior sides substantially perpendicular to said load supporting surface;
    a base section having a bottom and a pair of sides substantially perpendicular to said bottom, said slat slidably mounted on said base section such that said sides of said base section are located outwardly of said exterior sides of said slat, each of said sides of said base section being adapted to abut a side of an adjacent base section to prevent passage of matter beneath said slat; and liquid seal means adapted to be oriented between said sides of said base section and said side of an adjacent base section.

12. The construction of claim 11, wherein said sides of said base section each have a top portion with a channel therein, and said liquid seal means is a gasket in said channel.

13. The construction of claim 11, wherein said sides of said base section each have an exterior edge beveled to form a channel upon attachment with another base section, and said liquid seal means is a gasket in said channel.

14. The construction of claim 11, wherein said attachment of said base section to another base section is by a tongue longitudinally disposed on each of said sides and is adapted to fit with a groove on another base section.

15. The construction of claim 14, wherein said liquid seal means is a gasket between said tongue and the groove.

16. The construction of claim 11, wherein said attachment of said base section to another base section is by seat longitudinally disposed on each of said sides and adapted to fit with a flange on another base section.

17. The construction of claim 16, wherein said liquid seal means is a gasket between said seat and the flange.

18. The construction of claim 11, wherein attachment of said base section to another base section by a substantially L-shaped flange on each of said sides adapted to mate with a complementary substantially L-shaped flange on another base section.

19. The construction of claim 18, wherein said liquid seal means is a gasket between said substantially L-shaped flange of said base section and the complementary substantially L-shaped flange.

20. The construction of claim 11 further comprising an apparatus for retaining a reciprocating floor component on a supporting floor, the reciprocating floor component including said slat and said base section, said slat being slidably mounted on said base section, said base section having a lip on each of said sides, and the supporting floor having a flange, said apparatus comprising:
an elongate member having a broadened portion;
a retainer adjacent said elongate member; and
fastening means for securing said retainer to said elongate member such that one of said lips of said base section and the flange of the support floor are braced between said broadened portion of said elongate member and said retainer without compromising the structural integrity of said base section and the supporting floor.

21. A reciprocating floor construction comprising:
a first slat slidably mounted by bearing means on a first base section, said first slat having a load bearing surface, an exterior side and a lip located outwardly of said exterior side, said lip being substantially parallel with said load bearing surface and contacting said bearing means; and
a second slat slidably mounted by bearing means on a second base section, said second slat having a load bearing surface, an exterior side and a lip located outwardly of said exterior side, said lip being substantially parallel with said load bearing surface and contacting said bearing means, said lip of said first slat being oriented in proximity to said lip of said second slat to prevent passage of matter beneath said first slat and said second slat.

22. The construction of claim 21, further comprising a side on said first base section and liquid seal means wherein said side of said first base section has a top portion with a channel therein, and said liquid seal means is a gasket in said channel.

23. The construction of claim 21, further comprising a side on said first base section and liquid seal means wherein said side of said first base section has an exterior edge beveled to form a channel upon attachment with said second base section, and said liquid seal means is a gasket in said channel.

24. The construction of claim 21, further comprising a side on said first base section and liquid seal means wherein attachment of said first base section to said second base section is by a tongue longitudinally disposed on said first base section side and is adapted to fit with a groove on said second base section.

25. The construction of claim 24, wherein said liquid seal means is a gasket between said tongue and said groove.

26. The construction of claim 21, further comprising a side on said first base section and liquid seal means wherein said attachment of said first base section to said second base section is by a seat longitudinally disposed on said side and adapted to fit with a flange on said second base section.

27. The construction of claim 26, wherein said liquid seal means is a gasket between said seat and said flange.

28. The construction of claim 21, further comprising a side on said first base section liquid seal means wherein attachment of said first base section to said second base section by a substantially L-shaped flange on said side adapted to mate with a complementary substantially L-shaped flange on said second base section.

29. The construction of claim 28, wherein said liquid seal means is a gasket between said substantially L-shaped flange of said base section and said complementary substantially L-shaped flange.

30. The construction of claim 21 further comprising an apparatus for retaining a reciprocating floor component on a supporting floor, the reciprocating floor component including said slat and said base section, said slat being slidably mounted on said base section, said base section having a lip on said side and the supporting floor having a flange, said apparatus comprising:
an elongate member having a broadened portion;
a retainer adjacent said elongate member; and
fastening means for securing said retainer to said elongate member such that said lip of said base section and the flange of the support floor are braced between said broadened portion of said elongate member and said retainer without compromising the structural integrity of said base section and the floor member.

* * * * *